(12) United States Patent
Goodman

(10) Patent No.: US 7,742,769 B2
(45) Date of Patent: *Jun. 22, 2010

(54) METHODS AND APPARATUS FOR EXTRAPOLATING PERSON AND DEVICE COUNTS

(75) Inventor: William D. Goodman, Collegeville, PA (US)

(73) Assignee: Verizon Services Corp., Ashburn, VA (US)

( * ) Notice: Subject to any disclaimer, the term of this patent is extended or adjusted under 35 U.S.C. 154(b) by 395 days.

This patent is subject to a terminal disclaimer.

(21) Appl. No.: 11/537,611

(22) Filed: Sep. 30, 2006

(65) Prior Publication Data

US 2007/0032242 A1 Feb. 8, 2007

Related U.S. Application Data

(63) Continuation of application No. 09/933,063, filed on Aug. 20, 2001, now Pat. No. 7,123,918.

(51) Int. Cl.
H04Q 7/20 (2006.01)

(52) U.S. Cl. .................. 455/446; 455/456.1; 455/2.01; 455/425; 455/426.1; 455/453; 455/435.1; 455/440; 455/422.1

(58) Field of Classification Search .............. 455/575.1, 455/575.3, 453, 425, 414.2, 2.01, 426.1, 455/446, 456.1
See application file for complete search history.

(56) References Cited

U.S. PATENT DOCUMENTS

| 5,659,596 | A | * | 8/1997 | Dunn ...................... 455/456.1 |
| 6,192,243 | B1 | * | 2/2001 | Yang et al. .................. 455/436 |
| 6,487,413 | B1 | * | 11/2002 | Suojasto ..................... 455/446 |
| 6,535,745 | B1 | * | 3/2003 | Seraj .......................... 455/458 |
| 2002/0146978 | A1 | * | 10/2002 | Basson et al. .............. 455/11.1 |

* cited by examiner

*Primary Examiner*—Charles N Appiah
*Assistant Examiner*—Randy Peaches

(57) ABSTRACT

Methods and apparatus for providing statistics on the number, distribution and/or flow of people or devices in a geographic region based on active wireless device counts are described. Wireless devices may be of different types e.g., cell phones, PDAs, etc. Wireless communications centers report the number and type of active devices in the geographic region serviced by the wireless communications center and/or indicate the number of devices entering/leaving the serviced region. The active wireless device information is correlated to one or more targeted geographical areas. Population counts are extrapolated from the device information for the targeted geographic areas. Traffic and/or flow information is generated from changes in the device counts or population estimates over time and/or from information on the number of active devices entering/leaving a region. Reports may include predictions of crowd population characteristics based on information about the types and/or number of different wireless devices being used.

16 Claims, 8 Drawing Sheets

ACTIVE DEVICE STATISTICS 507

| GEOGRAPHIC REGION INFORMATION (CELL) | DEVICE TYPE | ACTIVE DEVICE COUNT |
|---|---|---|
| 1 | MPDA | 564 |
|   | NOTEBOOK COMPUTER | 190 |
|   | MOBILE TELEPHONE | 52 |
| 2 | NOTEBOOK COMPUTER | 373 |
|   | MOBILE TELEPHONE | 502 |
| 3 | MPDA | 144 |
|   | NOTEBOOK COMPUTER | 132 |

Fig. 6

TARGET AREA STATISTICS

| GEOGRAPHIC REGION OF INTEREST | DEVICE TYPE | ACTIVE DEVICE COUNT |
|---|---|---|
| 202 | MPDA | 318 |
| | NOTEBOOK COMPUTER | 501 |
| | MOBILE TELEPHONE | 528 |

METHODS AND APPARATUS FOR EXTRAPOLATING PERSON AND DEVICE COUNTS

FIELD OF THE INVENTION

The present invention is directed to methods and apparatus for providing statistics on the number, distribution and/or flow of people or devices in a geographic region, e.g., from information obtained from one or more wireless communications systems.

BACKGROUND OF THE INVENTION

It may be desirable to know the number, distribution, and/or flow of people and/or devices in a given geographic area. This desire may stem from, but is not limited to, security concerns when organizing an outdoor concert, the dispatching of rescue teams in the event of a natural disaster, or the need to measure the flow of cars to detect and possibly prevent traffic jams. Knowing the number of people in a given geographic area may help in the cases mentioned above. For example, the organizers of a concert may use the distribution of the spectators to place their security forces. Information on traffic flow can be used to redirect people around congested areas, etc.

Current techniques for estimating the number of people in a particular geographical area are mainly based on direct visual inspection and counting. This may involve monitoring of an area via video camera, and/or the use of physical counters at gates. Visual inspection and estimation techniques suffer from the subjective nature of human estimates, making the estimate a function of the individual doing the inspection. In addition, visual inspection techniques are stymied in situations where the people are not in plain sight. Another drawback to visual inspection techniques, e.g., where remote cameras are used, is that they can require expensive dedicated infrastructure, such as camera mounts and communications links along a highway. Alternative techniques, e.g., automated techniques for estimating the number of people in an area that do not depend on visual inspection, are desirable.

In particular there is a need for techniques for counting people that eliminates the dependence on visual inspection, and eliminates variations due to the personal judgment of a person doing the counting.

SUMMARY OF THE INVENTION

The present invention is directed to methods and apparatus for collecting and generating statistics relating to the number, distribution and/or flow of people or devices in a targeted geographic region. The techniques of the present invention use information on the number of active wireless devices in one or more geographic regions to generate such statistics. In addition to the total number of active wireless devices, information on the types of wireless devices in use, along with active device counts is maintained. Information on the number of active wireless devices entering and/or leaving an area are also collected and used in various embodiments.

Since the counting technique of the present invention can be fully automated, variance in counts due to the subjective nature of having a human being perform all or part of the counting operation are eliminated. Furthermore, the need to include visual inspection devices such as cameras to provide count information is eliminated.

In addition to generating device/people counts, by analyzing data over a period of time, information on the movement, e.g., flow, of devices and/or people in a geographic area are generated. Accordingly, the methods of the present invention are well suited for providing traffic flow information, e.g., information on how the number of people or devices in a geographic region varies over time.

The methods and operations of the present invention can be implemented using existing wireless networks, e.g., mobile telephone networks, and/or active wireless device networks according to the present invention is well suited for use with networks that broadcast and receive data from mobile computing devices such as notebook computers and/or person digital assistants (PDAs), or alternatively, cell phones.

In accordance with the present invention the number, and optionally, information on the type of active wireless devices in an area is collected in an automated manner. The active device count may be collected from each of a variety of wireless communication centers. As part of the process, active device count information is mapped, e.g., correlated, to one or more specific targeted geographic areas of interest. Devices in a broadcast area that do not fall in an area of interest are eliminated from the device count for the area. From generated statistics for a specific targeted geographic area reports including, e.g., wireless device counts, distribution, and/or flow information are generated and output in any one of a variety of formats.

In some embodiments the statistical data for a target area is further processed to take into consideration the portion of people that are likely to be utilizing multiple wireless devices.

In various embodiments, the present invention provides services such as measuring the size of a crowd. Another application of the present invention is to measure highway traffic flows and/or detect traffic jams.

While numerous features of the present invention are described below, in the context of an exemplary mobile telephone/mobile PDA/notebook computer embodiment, it is to be understood that the methods and apparatus of the present invention are not necessarily limited to such an embodiment and can be used in a wider range of applications and networks where mobile device statistics can be gathered and processed.

Various additional features and advantages of the present invention will be apparent from the detailed description that follows.

BRIEF DESCRIPTION OF THE DRAWINGS

FIG. 6 illustrates an exemplary set of wireless device statistics collected in accordance with the present invention for use by the processing center shown in FIG. 5.

FIG. 8 illustrates a set of target area statistics generated in accordance with the present invention.

DETAILED DESCRIPTION

As discussed above, the present invention is directed to methods and apparatus for providing statistics on the number, distribution and/or flow of people or devices in a geographic region. In accordance with various features of the present invention, person and/or device count, distribution, and/or flow, e.g., traffic, information for an area of interest, e.g., a targeted geographic area, is generated from information on the number of active wireless devices in the targeted geographic area. Information on the types of wireless devices being used provides additional information from which characteristics of the people in the targeted geographic area can, and in various embodiments are, predicted. The present invention can be integrated into existing wireless networks or be deployed in conjunction with new wireless systems.

Figure 1:
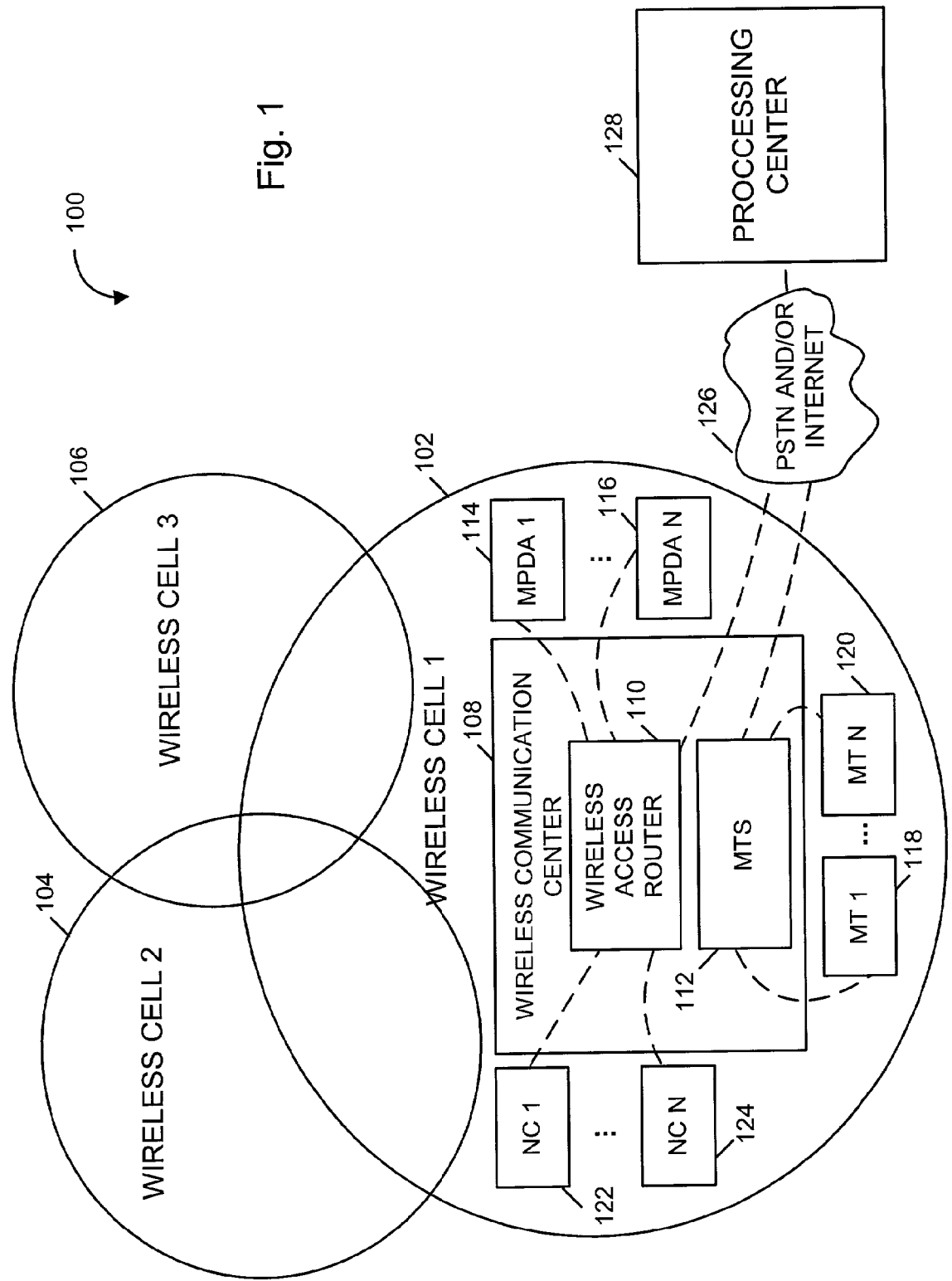
FIG. 1 is a block diagram illustrating an exemplary system of the present invention that generates statistics and/or reports on the number, distribution and/or flow of people or devices in a geographic region.

FIG. 1 illustrates a system 100 that includes three wireless cells 102, 104, 106, a processing center 128, and a public switched telephone network (PSTN) and/or Internet 126 coupled together as shown. Each of the wireless cells corresponds to a different geographic region represented by a circle. The geographic regions of the different cells 102, 104, 106 may partially or fully overlap. Each wireless cell 102, 104, 106 includes a wireless communications center 108. In the FIG. 1 example, the wireless communications center 108 includes a wireless access router 110 used for coupling mobile data devices to the Internet, and a mobile telephone switch (MTS) 112. Each wireless communications center 108, is coupled to a processing center 128, of the present invention through the PSTN, and/or through the Internet 126.

Wireless cell 1 102 of FIG. 1 shows a plurality of different wireless devices that can be used in accordance with an exemplary embodiment of the present invention. These devices include, e.g., mobile personal digital assistants (MPDAs) 114, 116, mobile telephones (MTs) 118, 120, e.g., cell phones, and notebook computers (NCs) 122, 124. MPDA 1 through MPDA N 114, 116, and NC 1 through NC N 122, 124 communicate with the wireless communication center 108 through a wireless access router 110. In this exemplary embodiment, the wireless access router 110 receives signals from, and transmits signals to, the wireless devices in the corresponding cell, e.g. cell 1. The wireless access router 110 collects and stores information about the active wireless devices within the cell including information on the type and number of active devices in cell 1. The wireless access router 110 sends, e.g., transmits, the collected information on the wireless devices to processing center 128. MTS 112 collects information on the type and number of active mobile telephones MT 1 through MT N 118, 120 in the same way the wireless access router 110 collects such information for the notebook computers 122, 124, and the MPDAs 114, 116 that it services. The MTS 112 transmits the collected information on the active wireless devices, e.g., cell phones to processing center 128. In this exemplary embodiment of the present invention the wireless access router 110 and the MTS 112 are shown to be in the same wireless communication center 108. However, it is to be understood that different cells 102, 104, 106 may support different types of wireless devices, and that some cells may support a single type of device.

Figure 2:
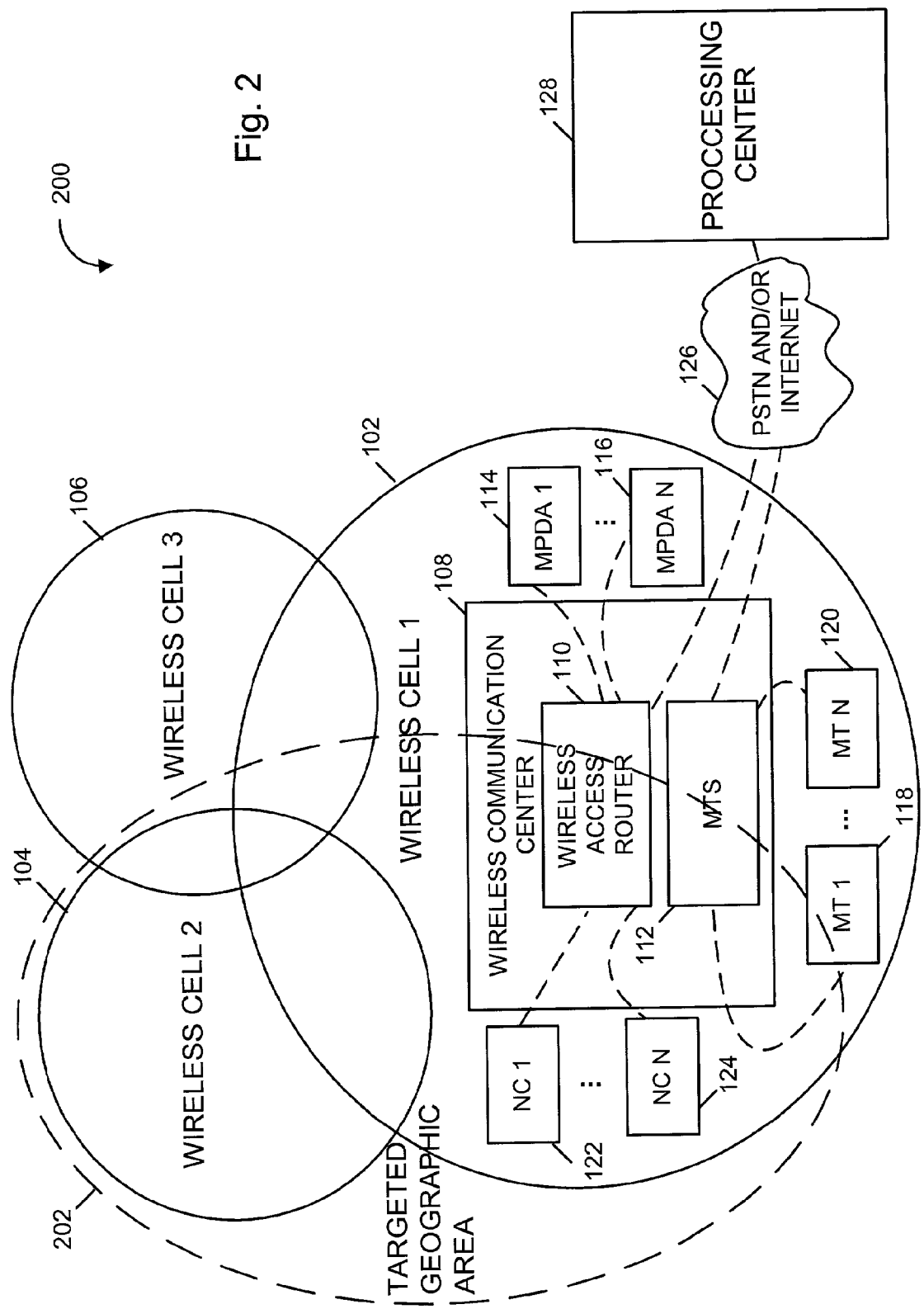
FIG. 2 illustrates a geographic area targeted for statistics reporting as it relates to the geographic area serviced by the system of FIG. 1

FIG. 2 illustrates system 100, of FIG. 1 as it relates to an exemplary targeted geographic area 202. This area is set at the processing center 128 and can be modified, e.g., the targeted geographic area can be set and/or changed by an administrator and/or end user setting the geographic area of interest at a particular time. FIG. 2 shows that targeted geographic area 202 may include portions of multiple cells. For example in FIG. 2, the targeted geographic area includes all of the area corresponding to wireless cell 2, and portions of wireless cells 1 and 3 102, 106. In this exemplary embodiment of the current invention, wireless communication center 108 detects and collects information on the active wireless devices in cell 1 102, and transmits the information to processing center 128. Wireless communications centers in cells 2 and 3 104, 106 also collect and forward such information to the processing center 128. Since cells 1 and 3 are only partially in the geographic area of interest 202, only a portion of the active devices counted in cells 1 and 3 will be relevant to determining the number of active devices and/or people in area 202.

Figure 3:
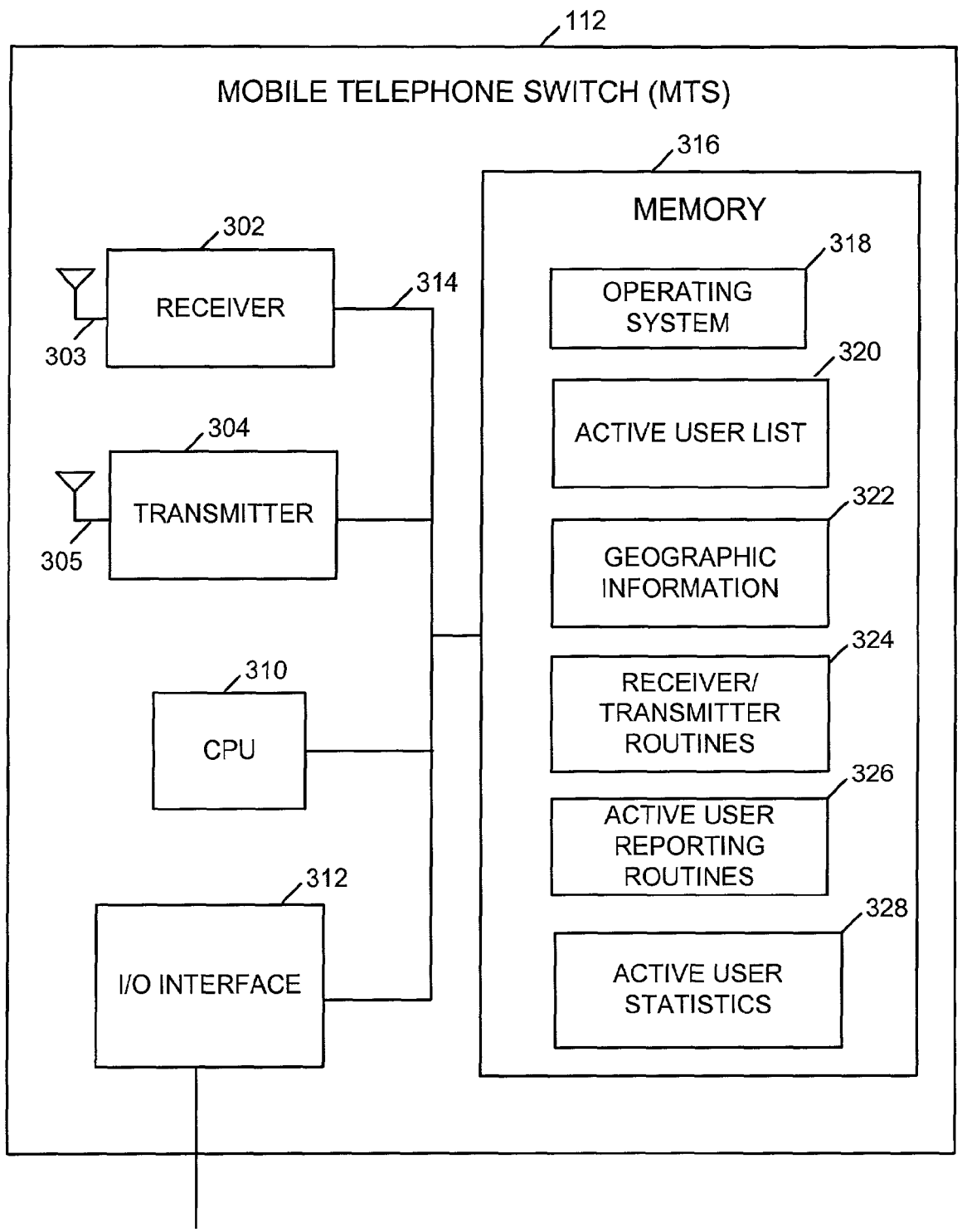
FIG. 3 illustrates a mobile telephone switch (MTS) implemented in accordance with the present invention, which can be used as the MTS shown in FIG. 1.

FIG. 3 illustrates an exemplary MTS 112. The MTS 112 includes input/output (I/O) interface 312, receiver 302, transmitter 304, memory 316 and central processing unit (CPU) 310, which are coupled together by bus 314. Antennas 303, 305 are coupled to receiver 302 and transmitter 304. I/O interface 312 is coupled to the PSTN and/or the Internet, this allows the MTS 112 to send and/or receive data to and from other devices and systems including processing center 128. Receiver 302 accepts signals from, and transmitter 304 sends signals to, active MTs. Receiver 302 and transmitter 304 allow the MTS 112 to gather active user statistics.

Memory 316 includes operating system 318, active user list 320, geographic information 322, receiver/transmitter routines 324, active user reporting routines 326, and active user statistics 328. The CPU 310 executes operating system 318, receiver/transmitter routines 324 and active user reporting routines 326, stored in memory 316. Routines 324 and 326 include a plurality of computer instructions for controlling various MTS operations. Under control of receiver/transmitter routines 324, the CPU 310 controls the receiver 302 and transmitter 304, so that it can communicate with wireless devices. Under control of active user reporting routine 326 the CPU 310 controls the MTS 112 to generate a set of active user statistics 328 and to transmit the statistics 328 along with geographic region information 322, indicating the geographic region serviced by the MTS 112, to processing center 128.

Active user list 320 is maintained and used by the MTS 112 for normal wireless activity, but it is also used in accordance with the invention to create the active user statistics 328. Geographic information 322 includes information identifying the geographic broadcast region serviced by the MTS 112, e.g., information identifying the location and size of cell 1 102. Active user statistics 328 includes information about the number and/or type of active MTs being serviced by the MTS 112 at any given time. The active user statistics 328 are used by the processing center 128 to generate a person and/or device count there from.

Figure 4:
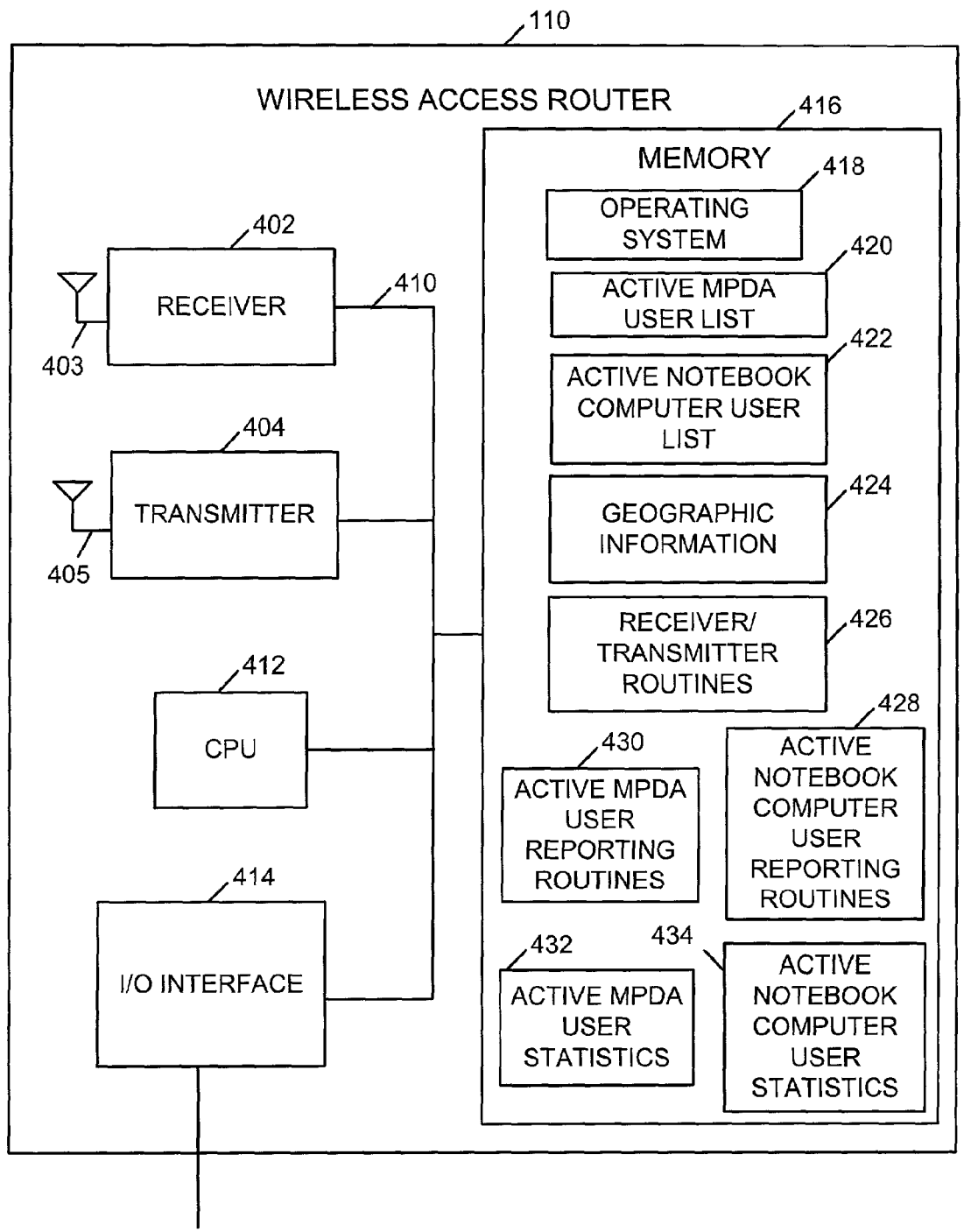
FIG. 4 illustrates a wireless access router implemented in accordance with the present invention, which can be used as the wireless access router shown in FIG. 1.

FIG. 4 illustrates an exemplary wireless access router 110. The wireless access router 110 includes input/output (I/O) interface 414, receiver 402, transmitter 404, memory 416 and central processing unit (CPU) 412, which are coupled together by bus 410. Antennas 403, 405 are coupled to receiver 402 and transmitter 404, respectively, thereby allowing for the receipt/transmission of signals over the air. I/O interface 414 is coupled to a PSTN and/or the Internet. This allows the wireless access router 110 to send and/or receive data to and from other devices and systems, including processing center 128. Receiver 402 accepts signals from, and transmitter 404 sends signals to, NCs and MPDAs.

Memory 416 includes operating system 418, active MPDA user list 420, active NC user list 422, geographic information 424, receiver/transmitter routines 426, active MPDA user reporting routines 430, active NC user reporting routines 428, active MPDA user statistics 432 and active NC user statistics 434. The CPU 412 controls the operation of the wireless access router 110 under control of operating system 418, receiver/transmitter routines 426, active MPDA user reporting routines 430 and active NC user reporting routines 428. Routines 426, 430 and 428 include a plurality of computer instructions for controlling various wireless router operations. Under control of the receiver/transmitter routine 426 the CPU 412 controls the receiver 402 and transmitter 404, so that it can communicate with wireless devices, e.g., MPDAs and notebook computers. Under control of active MPDA user reporting routine 430 and active notebook computer user reporting routine 428, the CPU 412 controls the wireless access router 110 to generate active MPDA user statistics 432 and active notebook computer user statistics 434, and to transmit the two sets of statistics 432, 434, along with geographic region information 424, indicating the geographic region serviced by the wireless access router 110, to processing center 128.

Active MPDA user list 420 and active NC user list 422 are used by wireless access router 110 for normal wireless activity. In addition, the active user list 420, 422 are used to create both the active MPDA user statistics 432 and active NC user statistics 434. Similar to MTS 112, geographic information 424 includes information identifying the geographic broadcast region serviced by the wireless access router 110, e.g., information identifying the location and size of cell 1 102. Active MPDA user statistics 432 and active NC user statistics 434 include information about the number and/or type of active MPDAs and NCs being serviced by the wireless access router 110 at any given time. The active MPDA user statistics 432 and the active NC user statistics 434 are used by the processing center 128 to extrapolate a person and/or device count there from.

Figure 5:
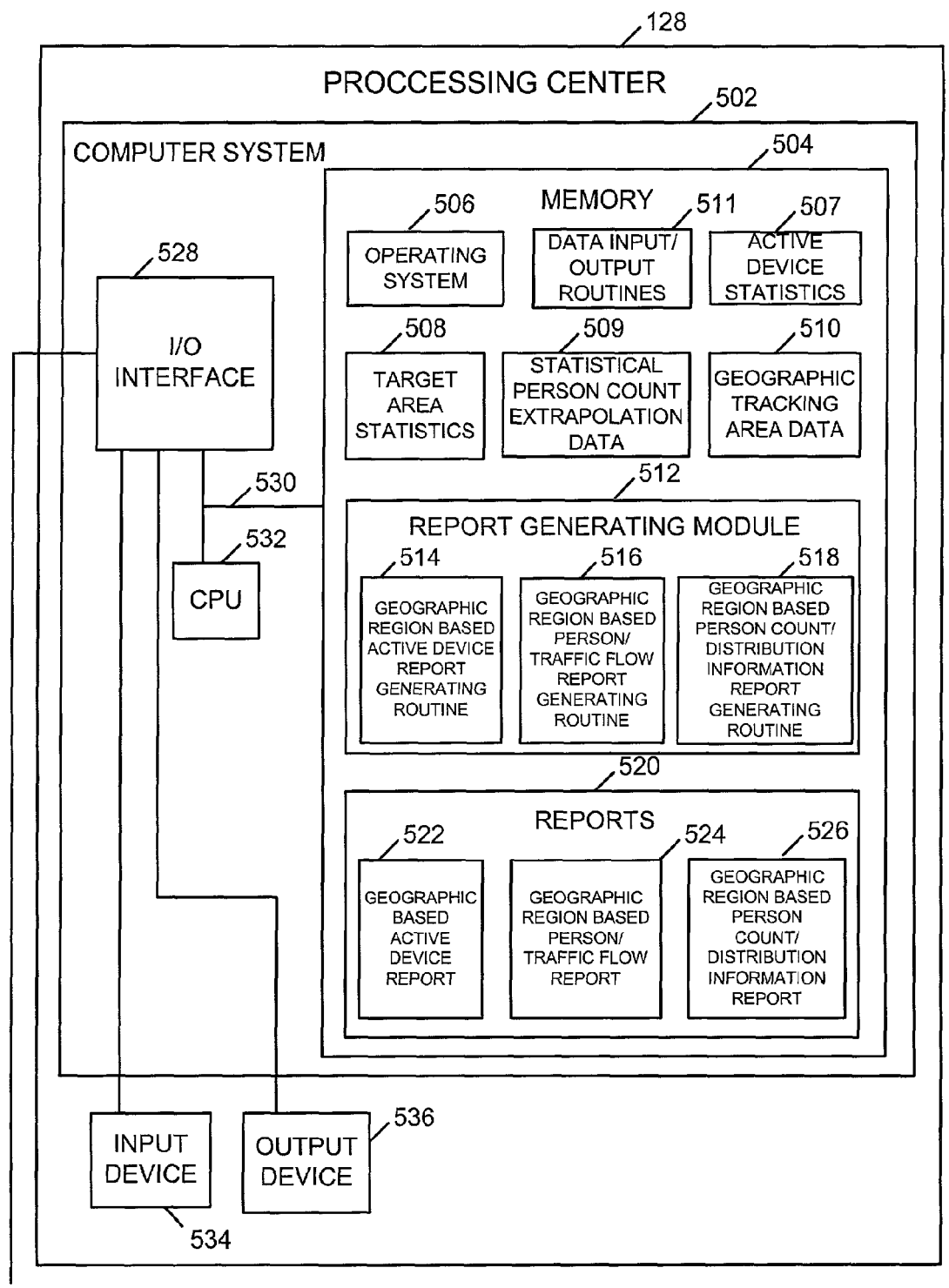
FIG. 5 illustrates a processing center implemented in accordance with the present invention, which can be used as the processing center shown in FIG. 1.

FIG. 5 illustrates an exemplary processing center 128 of the present invention. The processing center 128 includes computer system 502, input device 534 and output device 536. The computer system 502 includes, input/output (I/O) interface 528, memory 504 and CPU 532, which are coupled together by bus 530. The I/O interface 528 couples the computer system 502 to the PSTN and/or the Internet as well as input device 534 and output device 536. Input device 534 may be, e.g., a keyboard, while output device 536 may be, e.g., a display and/or printer. Using input and output devices 534, 536 a processing center administrator and/or a client of the service provided by the current invention can specify one or more geographic areas of interest and obtain from the output device 536, statistics for the specific geographic areas, e.g., person count, person distribution, and/or person flow statistics. The output may take the form of tables, charts, graphs, etc. In addition to receiving area of interest information and outputting statistics locally, the PSTN and/or Internet can be used to receive information designating an area of interest and to transmit generated reports and/or statistics to remote locations such as police stations, traffic control centers, newsrooms, etc.

The computer system's memory 504 includes operating system 506, active device statistics 507, target area statistics 508, statistical person count extrapolation data 509, geographic tracking area data 510, report generating module 512, and a set of reports 520. Active device statistics 507 include active device information received from one or more communication centers 108. An exemplary set of active device statistics 507 is illustrated in FIG. 6. The set 507 of active device statistics includes geographic region, device type and active device count statistics. As illustrated in FIG. 6, for each cell corresponding to a particular geographic region there are one or more device types and a count on the number of active devices listed according to device type.

Geographic tracking area data 510 includes information relating the probable distribution of active devices in a cell to different geographic regions within the cell. The geographic tracking area data 510 reflects the reality that device distribution within a cell is rarely uniform but is often predictable. For example, a small portion of a cell including a busy roadway such as a Turnpike may account for a disproportionate number of active devices in the cell. Geographic tracking area data 510 is used with active device statistics 507 to correlate the wireless devices that are used in the extrapolation to a geographic area of interest. These correlated values are stored, in the current exemplary embodiment, in target area statistics 508.

A plurality of reports 520 are generated from the active device statistics 507 and/or target area statistics 508 in accordance with the present invention. For example, person count data and/or information on the distribution of people in an area of interest may be extrapolated from the active device statistics 507 to generate a geographic region based person count/distribution information report 526. Other reports that can be generated, directly or indirectly, from the active device statistics 507 include a geographic based active device report 522, and a geographic region based person/traffic flow report 524.

Different types of people tend to use different types of devices. For example, business people are more likely to use notebook computers than the general population. Since different types of wireless devices may be used and tracked, insights into the characteristics of the people in a geographic region may be gained from correlating known user characteristics of particular types of devices with the active device information 507. For example, FIG. 6 shows that geographic region 1 has a large concentration of MPDA and notebook users, while geographic region 2 has more mobile telephones than MPDAs and notebook computers. This information may be helpful to businesses wanting to target outdoor advertising to particular demographic groups. It can also be used to provide insight into crowd composition and likely behavioral characteristics. For example, a relatively large number of MPDA and notebook computer users compared to cell phone users may indicate an area with a relatively high number of business people.

While executing operating system 506 and data input/output routines 511 stored in memory 504, the CPU 532 controls operation of the processing center 502. Routine 511 includes a plurality of computer instructions for controlling the input and output of data to and from computer system 502. Generation of reports 520 from received active device information is controlled by the routines included in report generating module 512. Report generating module 512 includes a geographic region based active device report generation routine 514, a geographic region based person/traffic flow generating routine 516 and a geographic region based person count/distribution information report generating routine 518. Under control of routine 511, the CPU 532 controls the processing center 128 to interact with various other system components including input device 534, output device 536 and the PSTN and/or Internet. Report generating operations preformed by processing center 128 will be discussed further in regard to the flow chart of FIG. 7.

Figure 7:
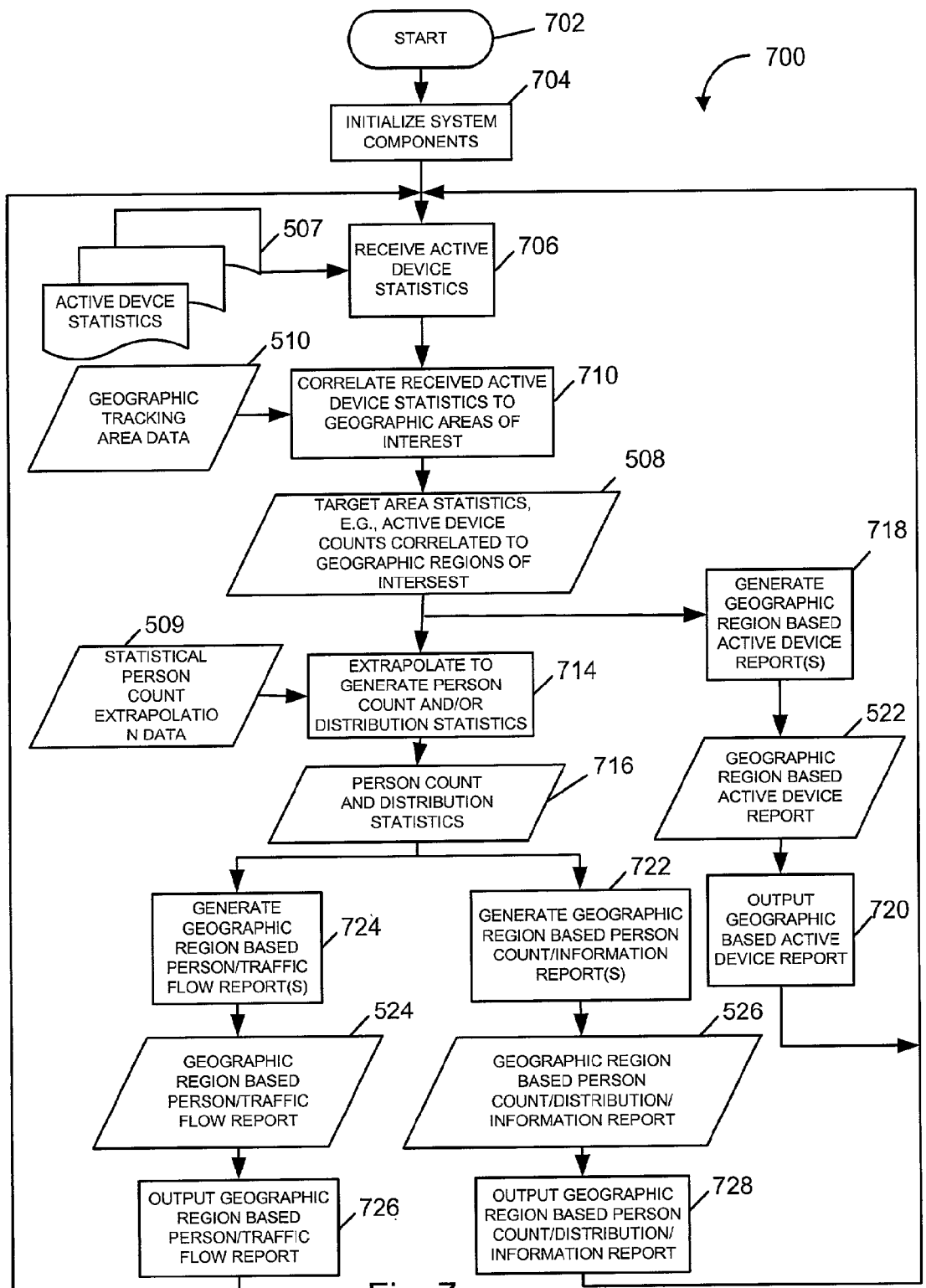
FIG. 7 illustrates the steps of a statistics generating and reporting method of the present invention.

FIG. 7 illustrates an exemplary method 700 for generating various reports from collected mobile device statistics. The method starts in step 702, e.g., with the computer system 502 of processing center 128 executing the report generating routines 512. Next, in step 704 the components, e.g., input/output interface 528, etc of computer system 502 are initialized. Then in step 706, the processing center 128 receives active device statistics 507 from one or more wireless communication centers 108.

Next in step 710, the active device statistics 507 are correlated to the geographic area or areas of interest, e.g., the area for which a report is to be generated. An exemplary geographic area of interest 202 is illustrated in FIG. 2 using dashed lines. Note that the area 202 encompasses all of wireless cell 2 104, approximately ½ of cell 1 102 and a small portion, e.g., approximately ¼, of cell 3 106. The correlation operation takes into consideration the relationship between the area of interest and the portion of devices in a cell for which statistics are received which are likely to be attributable to the area of interest. In determining the portion of the devices in a cell to attribute to a geographic region, device distribution information within a region stored in the geographic tracking area data 510 may be used.

In another embodiment of the present invention, wireless network technology currently being deployed for 911 calls is used to provide the precise location of wireless devices within cells which support such location functionality. In various embodiments where specific information on the location of active devices within a cell is available, such information is collected, e.g., by the MTS 112 and forwarded to the processing center 128 as part of the collected active device statistics. The specific device location information is used in correlation step 710 to determine the portion of active wireless devices that lie within the geographic area of interest. Using precise locations of wireless devices in this manner allows for a highly accurate determination to be made as to which particular active devices lie within the geographic area of interest.

Applying the above portions to the exemplary active device statistics 507 of FIG. 6 as done in one embodiment of step 710, produces the target area statistics 508 shown in FIG. 8.

The target area statistics 508 is the result of correlating the active device count information received from one or more mobile communications centers to the targeted geographic area of interest 202.

Two processing paths, each of which uses the generated target area statistics, proceeds from step 710. The first of these two paths beings in step 718, wherein the target area statistics 508 are further processed to generate one or more geographic region based active device reports 522. In one embodiment, the generated geographic region report includes the information in the target area device statistics 508 in addition to a sum of the total number of active devices and information on the time and/or date on which the active device count measurements in the report 522 are based.

In step 720, the report 522 generated in step 718 is output, e.g., sent to a display device to be displayed, sent to a printer to be printed or transmitted to a user of the system via the Internet and/or PSTN. The printed and/or displayed report may be used by one or more individuals. Operation proceeds from step 522 back to step 706 pending the receipt and processing of another set of active device statistics 507.

The second of these two processing paths extending from step 710 begins in step 714, wherein the target area statistics 508 are further processed, e.g., extrapolated, to generate a set of person count and/or person distribution statistics. For example, it can be estimated that ⅕ of a population in the area of interest will have active cell phones, ¹⁄₄₀ will have active PDA, and ¹⁄₂₀ will have active notebook computers with wireless commutations capability. This information may be obtained from the statistical person count extrapolation data 509. The device counts in the set of active device statistics 508 for the region of interest can, and in some embodiments are, multiplied in step 714 by the above mentioned percentages.

For example, applying such ratios to the statistics shown in FIG. 8 would produce an extrapolated population count for region 202 of (5 people/active cell phone×528 active cell phones=2640 people)+(20 people/active notebook computer×501=10020 people)+(40 people/active PDA×318 PDA=12720) for a total of 25,380 estimated people in region of interest 202. More advanced extrapolation techniques may also be used, e.g., techniques which take into account that some mobile device users are likely to have more than one active mobile device which would be reflected in the active device statistics. Such techniques may reduce the device counts used in the above exemplary calculation by a predetermined factor before they are used to generate the estimate of the people in the geographic region of interest 202.

In addition to including estimates of the number of people in a region of interest 202, the statistics 716 may include information on the distribution of the estimated people within the region of interest. Such distribution information may be based, in part, on statistics 706 which provide some insight into how cells corresponding to different portion of the geographic region of interest contributed to the overall extrapolated people estimate.

The person count and/or distribution statistics 716 generated in step 714 are supplied to report generation steps 722 and 724.

In step 722 a geographic region based person count/information report 526 is generated from the statistics 716. The generated report 526 includes the estimated number of people in a geographic region of interest 202 at one or more instants in time. It also can, and in various embodiments does, include information about the distribution of the estimated people in the region of interest 202. In some embodiments information on likely behavioral characteristics of the estimated people based on information about the type and number of wireless devices in use is also included in the report 526. Data and time information indicating when the statistics upon which the report 526 is based may also be included.

The generated geographic region based person count/distribution/demographic information report 526 is output in step 728, e.g., by the output device 536 or by communicating the report via the PSTN and/or Internet to a processing center user. Operation proceeds from report output step 728 back to step 706 pending the receipt of additional active device statistics.

The person count and/or distribution statistics 716 are used in step 724 along with target area statistics to generate estimates of the flow of people through a given geographic area of interest. In one embodiment active device counts and/or the estimated number of people in an area is monitored at different points in time. Changes in the active device counts and/or the estimated number of people in the geographic region of interest are determined by comparing the counts and/or estimates at different points in time. An increase in the number of active devices in a region or the estimated number of people in a region over time can be indicative of crowd formation or the start of a traffic jam. Decreases in the number of active devices in a region and/or the estimated number of people in a region over time may be indicative of crowd dispersion and/or relief of traffic congestion.

In some embodiments, the active device statistics 507 obtained from the wireless communications centers 108 include information on the number of new users entering the cell during a given reporting period and the number of users leaving the cell during the given reporting period. In accordance with one embodiment of the present invention, after being correlated to the geographic area of interest in step 710, the correlated user entry/exist information is used in step 724 to provide additional traffic flow information beyond that which can be derived directly from the active device count and/or people estimates.

Such information is particularly useful in cases where a relatively steady state condition has been achieved in terms of the number of active devices making it difficult to tell if traffic is flowing through an area or not. For example, while a large number of active devices may be detected in a geographic region including a major roadway, indicating the possibility of a traffic jam, if a large number of incoming and outgoing wireless devices is also indicated it is possible to distinguish between heavy constant traffic and a static traffic jam which might result in a similar number of wireless users in the region of the major roadway.

The generated geographic region based person/traffic flow report 524 is output in step 726, e.g., by the output device 536 or by communicating the report via the PSTN and/or Internet to a processing center user. Operation proceeds from report output step 726 back to step 706 pending the receipt of additional active device statistics.

In one embodiment of the present invention, monitoring the amount of people and the types of devices that pass a specific highway can produce traffic reports. For example, if the person count on a particular highway remains constant, and the types of devices that are detected also remain constant, a traffic jam is present. The various reports generated by the process 700 of the present invention can be printed, used and/or displayed by a wide range of system users including, e.g., police, newsrooms, traffic control centers, etc.

Numerous variations on the above described methods and apparatus are possible without departing from the scope of the invention.

What is claimed is:

1. A method of processing active wireless device statistics, the method comprising:
   receiving statistics on the number of active wireless devices in at least one communications cell;
   correlating the received statistics to a target geographic region of interest to determine an estimated number of active wireless devices in the target geographic region of interest; and
   estimating the number of people in the target geographic region of interest from the estimated number of active wireless devices in the target geographic region of interest.

2. The method of claim 1, wherein receiving statistics includes:
   receiving information indicating the location of devices within said at least one communications cell; and
   wherein said target geographic region of interest is a portion of said at least one communications cell.

3. The method of claim 2, wherein the received statistics include a first count corresponding to the number of active devices in a first communications cell and a second count corresponding to the number of active devices in a second communications cell, wherein the first count is a count of a first type of wireless device and said second count is a count of a second type of wireless device which is different from said first type.

4. The method of claim 3, wherein the first type of wireless device is a cell phone and the second type of wireless device is a personal data assistant.

5. The method of claim 3, further comprising: predicting characteristics of the people in the target geographic region of interest from the type and number of active wireless devices in the target geographic region of interest.

6. The method of claim 5, further comprising the step of:
   generating a report including the estimate of the number of people in the target geographic region of interest and information on the predicted characteristics of the people.

7. The method of claim 1, wherein estimating the number of people in the target geographic region of interest includes:
   performing an extrapolation operation on the estimated number of active wireless devices in the geographic region of interest to produce the estimate of the number of people in the geographic region of interest.

8. The method of claim 7, further comprising:
   generating a report including the estimate of the number of people in the geographic region of interest; and outputting said report.

9. The method of claim 7, further comprising:
   predicting the distribution of the estimated number of people in the target geographic region of interest from the received statistics on the number of active wireless devices.

10. The method of claim 9, further comprising:
    generating a report including the estimate of the number of people in the target geographic region of interest and information on the predicted distribution of the estimated number of people.

11. The method of claim 1, wherein said step of receiving statistics on the number of active wireless devices includes:
    receiving active wireless device statistics corresponding to different points in time; and
    generating, from received active wireless device statistics corresponding to at least two different points in time, information on the flow of traffic in the target geographic region of interest.

12. A method of generating a traffic flow report, the method comprising the steps of:
    collecting active wireless device statistics from a communications cell over a period of time;
    correlating the received statistics to at least one target geographic region;
    detecting changes in the collected active wireless device statistics correlated to said at least one geographic region; and
    generating a report including traffic flow information for said at least one geographic region based on detected changes in the collected active wireless device statistics.

13. The method of claim 12, wherein the detected changes include at least one of an increase and a decrease in the number of active wireless devices in a communications cell.

14. The method of claim 12, wherein the detected changes include changes in the identity of the active wireless devices being serviced by the cell.

15. An apparatus for estimating the number of people in a geographic region, the apparatus comprising:
    an interface for receiving an active wireless device count from at least one communications cell;
    means for correlating the received count to a target geographic region to determine an estimated number of active wireless devices in the target geographic region; and means for estimating based on the estimated number of active wireless devices the number of people in the geographic region including at least a portion of said communication cell.

16. The apparatus of claim 15, wherein said means for estimating the number of people further includes: means for performing an extrapolation operation on the estimate of the number of active wireless devices in the geographic region to produce the estimate of the number of people in the geographic region.

* * * * *